(12) United States Patent
Thauvin et al.

(10) Patent No.: US 6,360,109 B1
(45) Date of Patent: Mar. 19, 2002

(54) TERMINAL, AUTOMATIC RECALL PROCEDURE, AND TELECOMMUNICATION SYSTEM

(75) Inventors: Philippe Thauvin, Le Mans (FR); Alexandre Henon, Fremont, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/064,203

(22) Filed: Apr. 22, 1998

(30) Foreign Application Priority Data

Apr. 30, 1997 (FR) .............................. 97 05382

(51) Int. Cl.⁷ .................... H04M 1/00; H04B 1/38; H04Q 7/20
(52) U.S. Cl. .................. 455/564; 455/564; 455/575; 455/423; 455/425; 455/460; 455/466
(58) Field of Search ................ 455/8, 9, 67.1, 455/67.4, 423, 424, 425, 517, 507, 510, 188.1, 564, 566, 567, 575, 460, 461, 466; 370/328, 410, 522; 714/749; 317/335; 368/12, 13

(56) References Cited

U.S. PATENT DOCUMENTS

| | | | | |
|---|---|---|---|---|
| 3,885,108 A | * | 5/1975 | Zock | 179/90 |
| 4,119,810 A | * | 10/1978 | Marin et al. | 179/90 K |
| 5,905,952 A | * | 5/1999 | Joesuu et al. | 455/433 |

FOREIGN PATENT DOCUMENTS

| | | | | |
|---|---|---|---|---|
| JP | 61189055 | | 8/1986 | H04M/1/274 |
| JP | 06104969 | | 4/1994 | H04M/1/274 |
| JP | 08023370 | | 1/1996 | H04M/1/274 |
| WO | WO 95/20850 | * | 1/1995 | H04M/3/42 |
| WO | WO9520858 | | 8/1995 | |

* cited by examiner

Primary Examiner—Daniel Hunter
Assistant Examiner—Meless N Zewdu
(74) Attorney, Agent, or Firm—Dicran Halajian

(57) ABSTRACT

A terminal, automatic recall procedure, and telecommunication system are disclosed which include means for integrating an automatic repeat call function in a terminal of a telecommunication network provided with a data transfer protocol which operates in the simultaneous bidirectional mode. The automatic repeat call function is realized by a device which is integrated in a local terminal provided with a command which is to be triggered after an effort to achieve a connection to a distant terminal has failed, with the object of automatically repeating the effort until the connection has been established, but staying within the limit of a given number of repeat operations.

13 Claims, 4 Drawing Sheets

TERMINAL, AUTOMATIC RECALL PROCEDURE, AND TELECOMMUNICATION SYSTEM

A. FIELD OF THE INVENTION

The invention relates to a local terminal connected to a telecommunication network for communicating in the simultaneous bidirectional connected mode with at least one distant terminal.

The invention also relates to an automatic recall procedure which is put into operation by a local terminal after an effort to establish connection with a distant terminal has failed, the relevant terminals being connected to a telecommunication network and identified in the network by respective addresses and/or connection numbers.

The invention finally relates to a telecommunication system comprising at least one terminal referred to as local terminal and one terminal referred to as distant terminal which are capable of communicating in the simultaneous bidirectional connected mode.

B. BACKGROUND

A procedure for carrying out a repeat call request in a private telephone exchange controlled by a stored program is known from PCT patent application no. WO 95/20858 with German priority. This document describes the implementation of an automatic recall procedure available for communications between an internal subscriber of the private network and an external subscriber, based on a telephone exchange which already has this function for the internal communications.

This procedure can only be realized from a terminal connected to a telephone exchange which is provided with the desired function. It is not applicable from a terminal connected to a public network which does not offer this function.

C. SUMMARY OF THE INVENTION

It is an object of the invention, therefore, to provide means for achieving an automatic recall function integrated in a terminal of a telecommunication network, provided with a data transfer protocol which operates in the simultaneous bidirectional mode.

To achieve this object, a terminal as mentioned in the opening paragraph is characterized in that it comprises an integrated automatic recall device provided with a local command which is to be activated after an effort to establish a connection with a distant terminal has failed, so as to repeat automatically the effort until said connection has been established, while staying within the limit of a given number of repeat operations.

Similarly, a procedure as mentioned above is characterized in that it comprises the following steps:
  storage of the address and/or the number of the distant terminal,
  realization of a finite loop for repeating said effort to establish a connection with the address and/or the number stored,
  detection of a positive result if a connection has been established, and of a negative result if it has not,
  if the result is positive, transmission of connection signals for informing each terminal that the connection has been established,
  if the result is negative, transmission of a result signal for informing the local terminal that the connection effort has failed.

Finally, a system as mentioned above is characterized in that the local terminal comprises an integrated automatic recall device provided with a local command which is activated after an effort to establish connection with a distant terminal has failed, for the purpose of automatically repeating said effort until the connection has been established, while staying within the limit of a given number of repeat operations.

In a particularly advantageous embodiment applied to the field of mobile telephony, the invention renders it possible to reduce considerably the number of unsuccessful calls to a distant mobile terminal. Indeed, in certain regions where the radio infrastructure does not render it possible to carry the traffic correctly, especially in Singapore, the failure rate for the first call lies close to 100%.

The invention provides a mobile terminal fitted with an automatic recall function which is designed to improve the success rate of efforts to establish a connection with a distant mobile terminal via a mobile telephone network.

According to a major characteristic of the invention, therefore, a terminal, a procedure, and a system as defined respectively above are designed to operate by a mobile telephone standard of the GSM type (Global System for Mobile Communications), and in particular in conformity with a recommendation of the type ETS 300 505, Annex A, dated January 1996, of the ETSI (European Telecommunications Standards Institute), relating to the restriction of automatic repeat calls.

D. BRIEF DESCRIPTION OF THE DRAWINGS

The following description in conjunction with the attached drawings is given by way of example, to which the invention is by no means limited, and will render it clear how the invention may be implemented.

E. DESCRIPTION OF THE EMBODIMENTS

Figure 1:
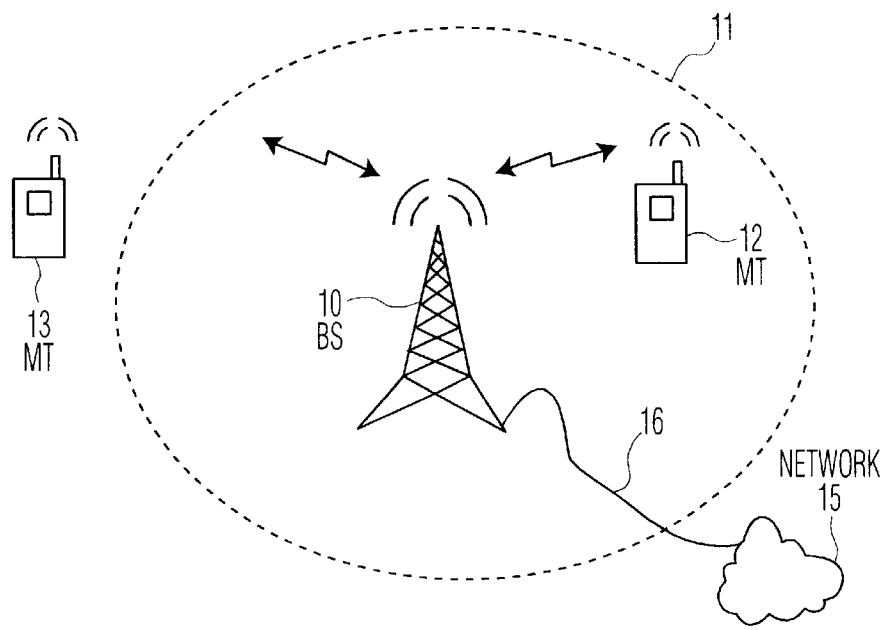
FIG. 1 shows a mobile telephone network comprising a local terminal and a distant terminal, in a first embodiment of the invention.
Figure 2:
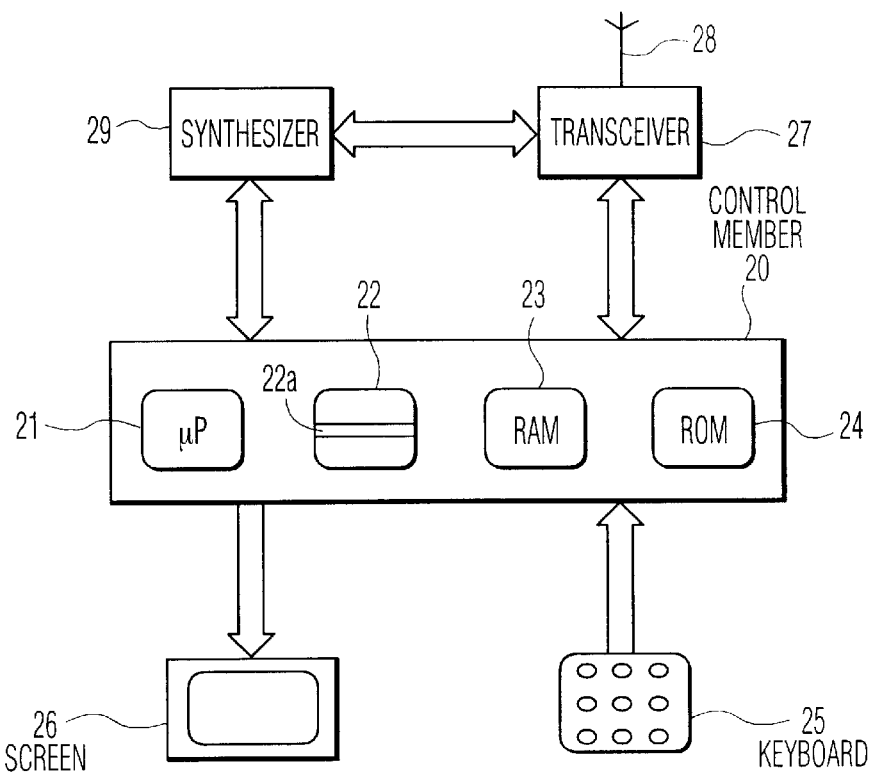
FIG. 2 is a block diagram of a circuit of the local terminal 12 shown in FIG. 1.

The embodiment illustrated in FIGS. 1 and 2 relates in particular to a digital cellular telephone system of the GSM type in conformity with the recommendation ETS 300 505 of the ETSI.

The diagram of FIG. 1 shows a simplified telecommunication network comprising a single radio base station 10 having a range of coverage 11 within which the mobile terminals 12 and 13 can be displaced while remaining in radio contact with the base station 10, which station is connected to the public telephone switching network 15 by means of a cable 16. In the example shown, the range of coverage of the GSM network is identical with the range 11 because the network comprises only a single base station 10. In the Figure, the terminal 13, called distant terminal, is situated outside the range of coverage 11 of the GSM network, and is accordingly out of reach of the terminal 12 or local terminal. If the terminal 12 carries out a first effort to achieve connection with the terminal 13, this effort will fail because the terminal 13 is outside the range of coverage 11 of the network.

According to the invention, the terminal 12 then activates an automatic recall device for repeating its effort a certain number of times (a maximum of 10 times according to the recommendation ETS 300 505, annex A), until the terminal 13 has entered the range of coverage 11 and is capable of receiving its call. The annex A of recommendation ETS 300 505 in fact regulates the automatic repeat calls sent from a terminal connected to a network of the GSM type or from a satellite connected to the terminal. The number of authorized repeat calls is limited, said limit varying with the cause of the failure of the first effort to achieve a connection.

The moment the automatic recall device of the terminal 12 detects the establishment of the connection, for example because the mobile telephone 13 has entered the range of coverage 11, the recall device will trigger a connection signal on the local terminal 12 to inform the user that his or her remote counterpart (who uses terminal 13) is on the line. Simultaneously, the terminal 12 transmits to the distant terminal 13 a signal to invite the distant subscriber to wait some time until the local subscriber in his or her turn lifts the receiver, if so desired. These information signals may be acoustic signals, visual signals, or mechanical signals, the radio telephones 12 and 13 being usually fitted with a microphone, a display screen, and/or a vibration unit.

A circuit of the terminal 12 in which the invention is realized is shown in FIG. 2. The control member 20 comprises:

- a data processor 21 ($\mu C$),
- a memory 22 of the EEPROM (Electrically Erasable Programmable Read Only Memory) type in which is stored in particular the telephone number of the terminal 13 to be contacted,
- a memory 23 of the RAM (Random Access Memory) type, and
- a non-volatile memory 24 of the ROM (Read Only Memory) type for storing the main operating program of the device.

The control member 20 also receives signals from the keyboard 25 and controls the display on the screen 26 of the radio telephone. Finally, it controls a transmission/reception circuit 27 coupled to an antenna 28 for exchanging electromagnetic radio signals with the base station 10. These signals are processed by a synthesizer 29 of which an output is directly connected to the data processor 21 which transforms them into data blocks in accordance with a protocol defined by the GSM standard.

When a connection is achieved between the terminals 12 and 13 at the request of the terminal 12, the processor 21 of the local terminal 12 receives a message of acknowledgement of the connection from the terminal 13 in a signalization block. The processor 21 then triggers the suitable treatment for informing the two parties 12 and 13 that the connection has been established.

In general, the time lapse or waiting time between two consecutive automatic repeat calls depends on the cause of the original failure or on the number of repeat calls already made. In a modification of this first embodiment, this waiting time may also be chosen by the user as a function of personal criteria connected in particular with the identity of the called subscriber. In that case, it is possible to provide on the menu of the telephone 12 a complex automatic recall function which supports parameters which can be adjusted by the user for fixing the waiting time between two repeat calls as a function of different criteria such as, for example, the day in the week or the called number. A recall list 22a containing several numbers to be recalled may be stored in the memory 22. The processor 21 then has the task of utilizing the recall list 22a such that the user is enabled to carry out automatic repeat calls which are very widely spaced in time so as not to block out the use of the telephone for other calls.

The possibility of modifying the waiting time between two consecutive repeat calls enhances the ergonomic quality of the telephone. This function is found to be highly useful for making contact with a travelling subscriber who may encounter non-covered zones or who may voluntarily exclude his telephone from receiving calls in those countries where the reception of calls is subject to a charge.

The automatic recall procedure according to the invention will now be explained with reference to the steps K0 to K12 in FIG. 3.

In box K0, the local processor initiates a first effort to achieve a connection upon a command from the local user. In box K1, the processor tests the result of the effort by monitoring the reception of an acknowledgement of the connection from the called terminal. If the test result is positive (Y), the process continues with box K2, if it is not (N), it passes directly to box K4. In box K2, the acknowledgement of the connection is received, the call has consequently been started, and the two terminals can communicate until one of them disconnects itself and thus causes the transition to box K3, where at least the local terminal is at rest.

In box K4, where the effort to achieve a connection has failed, the local processor verifies that the automatic repeat call function is selected. If this is the case (Y), the process continues with box K5, if it is not (N), it ends at box K3.

In box K5, a counter CPT is incremented by one unit (CPT+1) so as to indicate a reiteration of the effort to achieve a connection. In box K6, the value of this counter is tested (CPT<10) so as to verify that the maximum number of repeats authorized by the standard has not yet been reached. If the test (CPT<10) is negative (N), the process ends with box K7, where a connection failure signal is locally transmitted to the user of the telephone. If the test (CPT<10) is positive (Y), the process continues with box K8, where a delay time $\Delta t$ is started so as to wait a certain period before a new effort is made to achieve a connection. This waiting time depends inter alia on the standards used. In box K9, the sign of this delay time is tested so as to detect whether it has elapsed.

This brings us to box K10, where a new effort is made to achieve a connection. The processor monitors the detection of a signal ("receiver lifted") from the called subscriber. In box K11, the result of the effort is tested. It is positive if the ("receiver lifted") signal is detected, and negative if this is not detected.

The details of the execution of the steps K10 and K11 (shown in box 30) vary with the chosen embodiment. In fact, the detection of "receiver lifted" on the part of the called subscriber is realized differently in a telephone network with analog access and in a digital network operating with the transfer of packets.

If the result of step K11 is negative (N), the process is resumed from box K5. If the result is positive (Y), the connection is established between the two terminals, and the process continues with box K12 with the transmission of a signal at the level of the local terminal so as to inform the calling subscriber that the connection has been established (the called subscriber has lifted the receiver), then with box K13 with the transmission of a signal at the level of the distant terminal so as to invite the called subscriber to wait until his or her counterpart (the calling subscriber) in his/her turn lifts the receiver. The steps K12 and K13 may be carried out in any order, or even simultaneously. Then the communication takes place normally in box K2 and ends in box K3.

Figure 4:
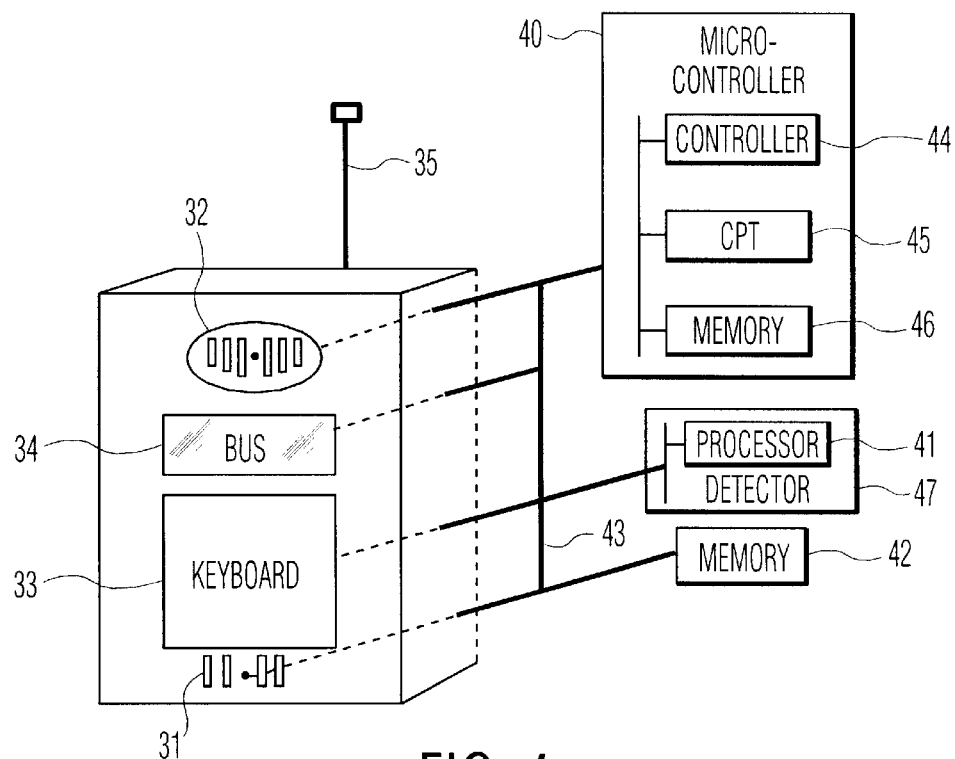
FIG. 4 shows an analog telephone in a second embodiment of the invention.

FIG. 4 shows an example of a telephone terminal in a second embodiment of the invention. This is an analog mobile device with a microphone 31, a loudspeaker/earpiece 32, a keyboard 33, a screen 34, and an antenna 35. This device is also provided with a microcontroller 40 and two audio processors 41 and 42 which are connected by a bus 43. The microcontroller 40 comprises in particular a controller proper 44, a programmable memory 45, and a fixed memory 46.

It is possible to use, for example, the audio processors SA5752, SA5753, and the microcontroller 8051 manufactured by Philips Semiconductors for the processors 41, 42 and for the microcontroller 40, respectively, in the case of an analog mobile telephone operating in accordance with the ETACS standard (Extended Total Access Communications System), or the AMPS standard (Advanced Mobile Phone Service).

The audio processor SA5752 in particular comprises a voice detector 47 which supplies a signal indicating the presence or absence of a voice in the form of an analog signal at one of the outputs of the audio processor 41. This voice detector 47 is used for distinguishing whether a signalization voice is present so as to detect whether the called subscriber has "lifted the receiver". This embodiment is particularly advantageous because it utilizes the fact that the processor SA5752 is present in numerous telephones of this type.

The volatile memory 45 comprises in particular a counter CPT which is to count the number of efforts made to achieve a connection by means of the automatic recall device. As for the fixed memory 46, this contains control instructions of the microcontroller 40.

In this embodiment, the telephone device according to the invention thus comprises detection means as to whether the called party has lifted the receiver while a communication is being established between a caller and another party. These means are used for triggering the transmission of information messages destined for two connected terminals when the "receiver lifted" signal has been detected.

Figure 3:
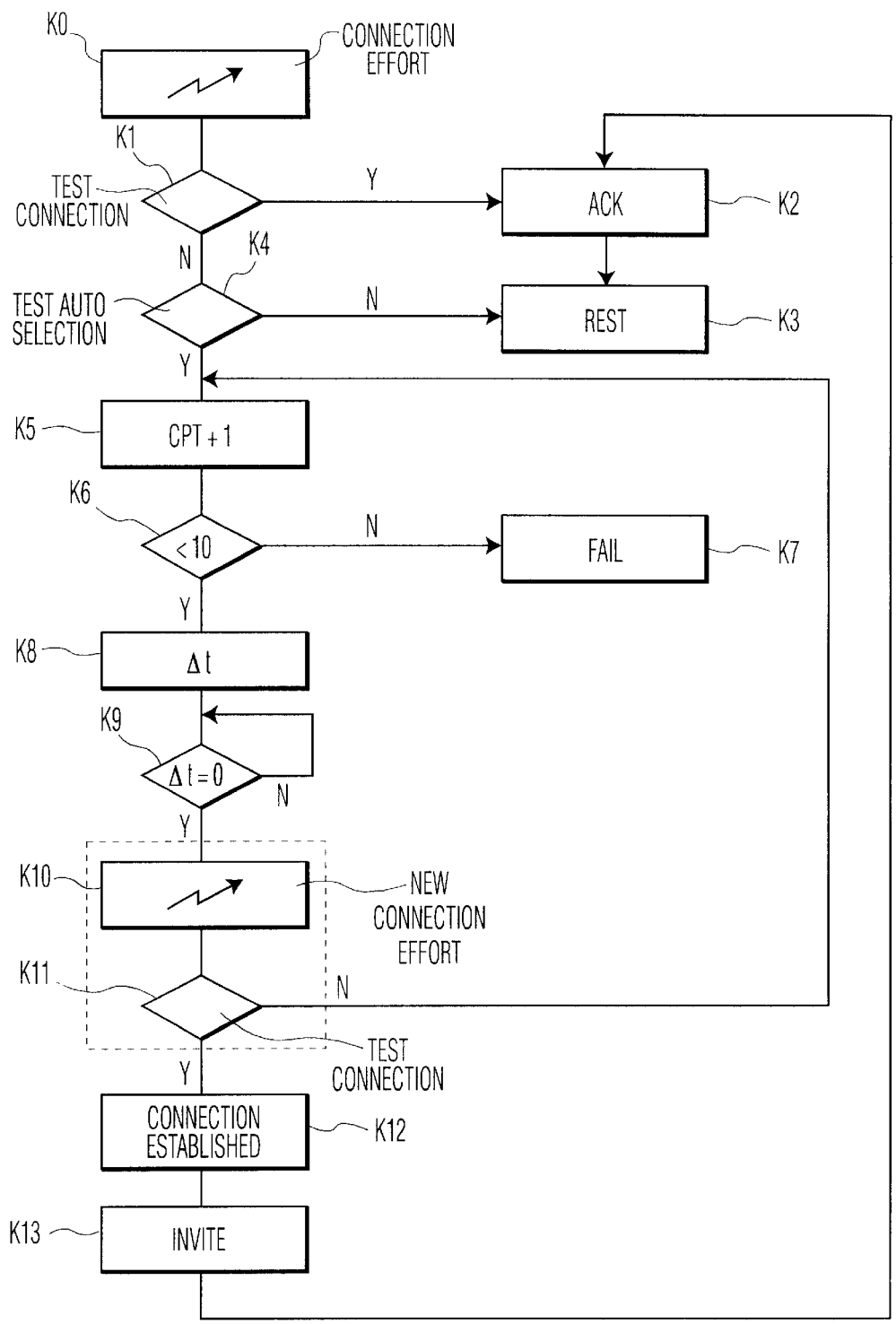
FIG. 3 is a flowchart depicting the operation of the automatic recall procedure according to the invention.
Figure 5:
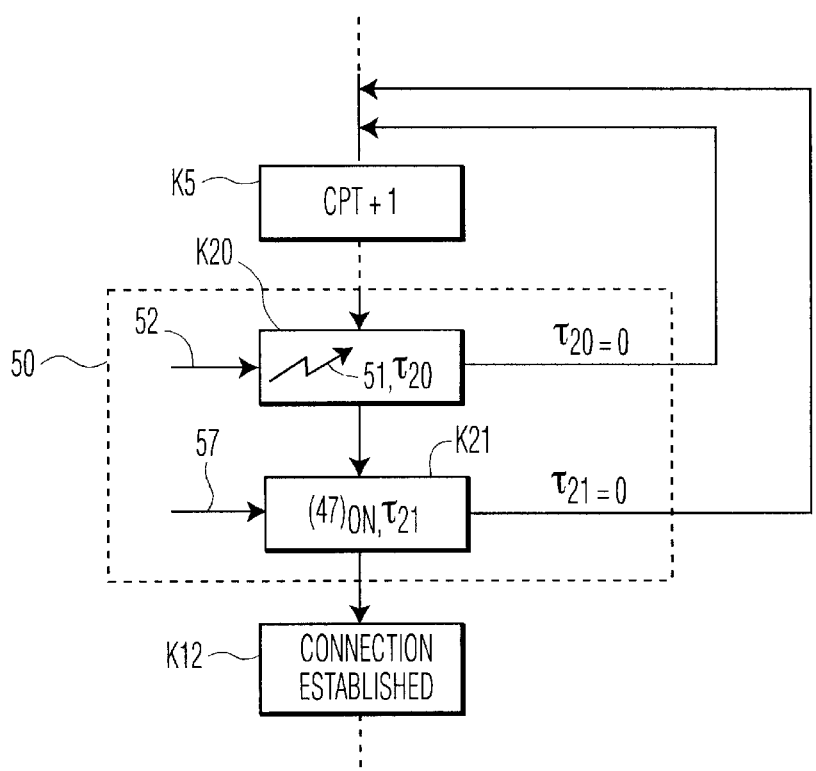
FIG. 5 is a flowchart depicting the operation of the procedure as carried out in the telephone shown in FIG. 4.

The instructions relating to this second embodiment are represented in the diagram of FIG. 5, where the steps K20 and K21 (in frame 50) replace the steps K10 and K11 shown in FIG. 3 in frame 30.

In box K20, the analog mobile telephone transmits a request 51 to its base radio station over a channel reserved for service so as to obtain a voice channel on which it can communicate with the called party by frequency modulation. The mobile phone is then waiting for the assignment 52 of this voice channel (until a time period $\tau_{20}$ has elapsed). If this channel has not been assigned to the telephone before the waiting period $\tau_{20}$ has elapsed (symbolized by the arrow with the legend $\tau_{20}=0$), the process is resumed at box K5 in FIG. 3.

If the voice channel is assigned before this delay time has elapsed, the process continues with box K21. The voice detector 47 of the processor SA5752 is activated (symbolized by the legend $(47)_{ON}$) while at the same time a delay $\tau_{21}$ is started. The processor supplies at its output a signal indicating the absence or presence of a voice on the voice channel. The detection of this output signal accordingly renders it possible to detect whether the called party has lifted the receiver. The mobile telephone then remains waiting until one of the following events takes place: the processor SA5752 detects the presence of a voice on the voice channel (this event is indicated with arrow 57), or the delay time $\tau_{21}$ elapses (this event is indicated with the arrow with the legend $\tau_{21}=0$). If the event 57 does not occur before the delay time ($\tau_{21}=0$) has elapsed, the process is resumed at box K5.

If the event 57 takes place before the delay time $\tau_{21}$ has elapsed, the process continues with box K12 of FIG. 3.

Figure 6:
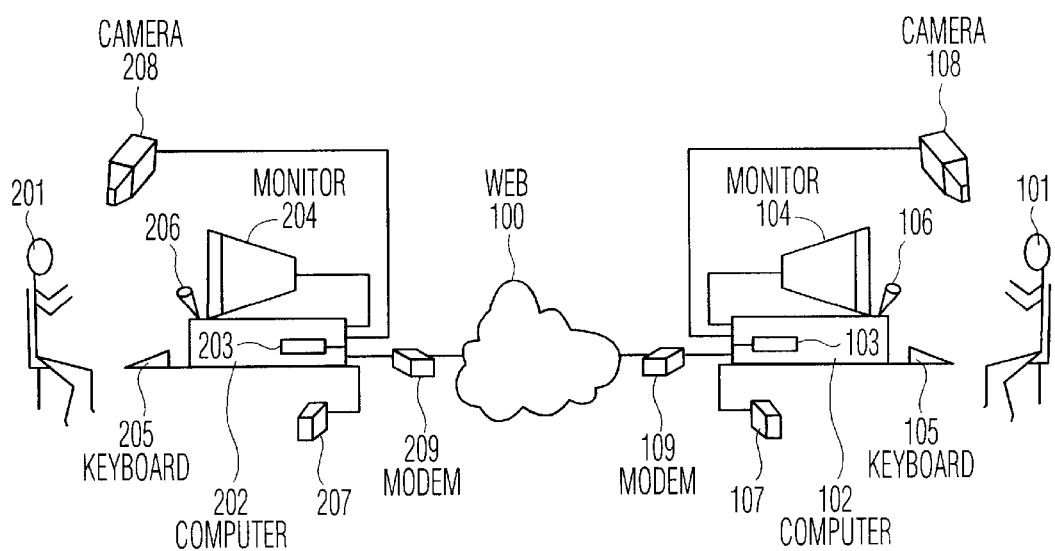
FIG. 6 shows an example of a telecommunication system in accordance with a third embodiment of the invention.

The system shown in FIG. 6 comprises, in accordance with the invention: a local terminal and a distant terminal capable of communicating by video conference via the Internet. The local terminal comprises an automatic recall device according to the invention for increasing its chances of obtaining a connection with the distant terminal.

This embodiment is particularly advantageous when a terminal, for example situated in France, wants to communicate with a distant terminal, for example situated in Australia. The telephone system via the Internet in effect benefits from lower charges for long distances than those made in a conventional public telephone network.

The diagram of FIG. 6 shows the Internet web 100 which connects a local user, or netsurfer 101, with a distant user, or netsurfer 201. To implement the automatic recall procedure as described with reference to FIG. 2 but now applied to a video conference via the Internet 100, each netsurfer 101, 201 has available a specific equipment comprising at least the following components:

a central computer unit 102, 202 provided with an audio card 103, 203 for digitizing and restoring the spoken sound, a display monitor 104, 204, a keyboard 105, 205 for entering commands into the central unit 102, 202, a microphone 106, 206, a loudspeaker/earpiece 107, 207, a digital camera 108, 208 for filming and subsequently transmitting the image over the network 100, a modem 109, 209 for transferring the information transmitted to the central unit 102, 202 via the network 100 by means of peripheral units 103 to 108, 203 to 208.

The central unit 102 is provided with an automatic recall device according to the invention, which is controlled from the keyboard 105 after an effort to achieve "manual" connection with the terminal of the netsurfer 201 has failed. The device comprises a processor, a volatile memory for storing momentarily at least the connection number (called Internet address here) of the netsurfer 201, and a non-volatile memory for storing the main operating program of the computer as well as the communication protocols of the various peripheral units 103 to 109. The processor recognizes inter alia the protocols for the transfer of data via the modem 109. The transfers of useful data (among which the signalling data) are carried out on the Internet via the telephone line in the simultaneous bidirectional mode such that the netsurfers 101 and 102 can communicate simultaneously, as is the case in conventional telephony. More in particular, the central unit 102 is capable of detecting the reception of a message of acknowledgement of the connection emitted by the distant terminal and transmitted to the central unit 102 via the modem 109. The reception of a connection acknowledgement corresponds to the detection of the "receiver lifted" signal from the called party in conventional telephony here. The detection of the "receiver lifted" signal from the called party is in effect indispensable for realizing the process according to the invention.

A terminal, an automatic recall procedure, and a telecommunication system have thus been described by means of examples for providing means to increase the success rate of calls to a terminal connected to a telecommunication network.

Indeed, the invention is not limited to the embodiments described, but variations will be possible to those skilled in the art without departing from the scope of the invention.

What is claimed is:

1. A local terminal for communication with a distant terminal, said local terminal comprising an automatic recall device for recalling a number of said distant terminal when an automatic repeat function of said local terminal is selected; wherein, when an effort to establish a connection with said distant terminal fails, said local terminal activates said automatic recall device without intervention of a local user of said local terminal to repeat said effort in accordance with a predetermined number of repeat calls and a predetermined waiting time between said repeat calls; and wherein said local terminal transmits to said distant terminal a signal to invite a distant user of said distant terminal to wait until said local user is connected to said distant terminal; said predetermined number and said predetermined waiting time being adjustable as a function of a day of a week.

2. The local terminal of claim 1, wherein said predetermined number and said predetermined waiting time are adjustable by said local user through a menu.

3. The local terminal of claim 1, wherein said automatic recall device informs said local user that a connection with said distant terminal is established.

4. The local terminal of claim 1, further comprising a processor which verifies that said automatic repeat function is selected prior to activation of said automatic recall device.

5. The local terminal of claim 1, further comprising a voice detector, said telephony device requesting assignment of a voice channel from a base station over a service channel, wherein said voice detector is activated in response to assignment of said voice channel to detect voice of said distant user on said voice channel.

6. The local terminal of claim 1, wherein said automatic recall device comprises:
   memory means for storing at least the number of the distant terminal;
   automatic recovery means for recovering the number from the memory means to repeat the effort to establish said connection;
   means for detecting establishment of said connection;
   means for emitting connection signals for informing said local terminal and said distant terminal of the establishment of said connection if said connection is detected; and
   means for emitting a signal representing failure of establishing said connection so as to inform the local terminal when said connection fails to be established.

7. The local terminal of claim 1, wherein said local terminal is a mobile terminal and is connected by radio to a mobile telephone network which conforms to a recommendation of the ETS 300 505 type, Annex A, January 1996.

8. The local terminal of claim 1, wherein said communication is established through a public telephone network with analog access; said automatic recall device comprising detection means of whether the distant terminal has lifted a receiver, based on a differentiation between voice signals and non-voice signals received by the local terminal.

9. A telecommunication system comprising a local terminal and a distant terminal, said local terminal comprising an automatic recall device for recalling a number of said distant terminal when an automatic repeat function of said local terminal is selected; wherein, when an effort to establish a connection with said distant terminal fails, said local terminal activates said automatic recall device without intervention of a local user of said local terminal to repeat said effort in accordance with a predetermined number of repeat calls and a predetermined waiting time between said repeat calls; and wherein said local terminal transmits to said distant terminal a signal to invite a distant user of said distant terminal to wait until said local user is connected to said distant terminal; said predetermined number and said predetermined waiting time being adjustable as a function of a day of a week.

10. A method of establishing a connection from a local terminal to a distant terminal comprising:
    automatically recalling a number of said distant terminal without intervention of a local user of said local terminal when an automatic repeat function of said local terminal is selected;
    repeating an effort to establish said connection with said distant terminal fails in accordance with a predetermined number of repeat calls and a predetermined waiting time between said repeat calls, when said effort fails;
    transmitting from said local terminal to said distant terminal a signal to invite a distant user of said distant terminal to wait until said local user is connected to said distant terminal; and
    adjusting said predetermined number and said predetermined waiting time as a function of a day of a week.

11. The method of claim 10, further comprising:
    storing of the number of the distant terminal;
    realising of a finite loop for repeating said effort to establish said connection using the number of the distant terminal;
    detecting a positive result if said connection has been established;
    detecting a negative result if said connection has not been established;
    transmitting connection signals for informing said local terminal and said distant terminal that the connection has been established in response to said positive result; and
    transmitting a result signal for informing said local terminal that the connection effort has failed.

12. The method of claim 11, wherein the acts of detecting the positive result and the negative result comprises detecting whether the distant terminal is off-hook through differentiation between voice signals and non-voice signals received by the local terminal through a public telephone network with analogue access.

13. The method of claim 10, wherein said local terminal is a mobile terminal and is connected by radio to a mobile telephone network which conforms to a recommendation of the ETS 300 505 type, Annex A, January 1996.

* * * * *